US012634819B2

(12) United States Patent
Lee et al.

(10) Patent No.: US 12,634,819 B2
(45) Date of Patent: May 19, 2026

(54) DATA COLLECTION SYSTEM AND METHOD USING RECONFIGURABLE INTELLIGENT SURFACE FOR WAKE-UP CONTROL, AND COMPUTER-READABLE RECORDING MEDIUM STORING INSTRUCTIONS THEREFOR

(71) Applicant: Research & Business Foundation SUNGKYUNKWAN UNIVERSITY, Suwon-si (KR)

(72) Inventors: Tae-Jin Lee, Suwon-si (KR); Jung-Min Yoon, Suwon-si (KR); Kyoung Min Kim, Suwon-si (KR); Eun-Jin Choi, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 549 days.

(21) Appl. No.: 17/984,390

(22) Filed: Nov. 10, 2022

(65) Prior Publication Data

US 2023/0171692 A1     Jun. 1, 2023

(30) Foreign Application Priority Data

Nov. 11, 2021     (KR) ........................ 10-2021-0155053

(51) Int. Cl.
*H04W 52/02* (2009.01)
*H04W 74/0808* (2024.01)

(52) U.S. Cl.
CPC ... *H04W 52/0216* (2013.01); *H04W 52/0219* (2013.01); *H04W 74/0808* (2013.01)

(58) Field of Classification Search
CPC ......... H04W 52/0216; H04W 52/0219; H04W 52/02; H04W 52/0206; H04W 52/0229;
(Continued)

(56) References Cited

U.S. PATENT DOCUMENTS

2019/0159127 A1* 5/2019 Son ................... H04W 52/0216
2019/0254110 A1* 8/2019 He ....................... H04L 41/0896
(Continued)

OTHER PUBLICATIONS

Gong, Shimin, et al. "Toward Smart Wireless Communications via Intelligent Reflecting Surfaces: A Contemporary Survey." IEEE Communications Surveys & Tutorials 22.4 (2020): (33 pages).
(Continued)

*Primary Examiner* — Robert C Scheibel
(74) *Attorney, Agent, or Firm* — NSIP Law

(57) ABSTRACT

There is provided a data collection system. The data collection system comprises a wake-up radio (WuR) terminal that operates in sleep mode when a wake-up signal is not received and transmits data in active mode when the wake-up signal is received; an Access Point (AP) terminal that stores information on a total number of WuR terminals in a network and sensing data collected by the WuR terminal, sets a slot through which the data is to be transmitted by the WuR terminal, and receives the data from the WuR terminal in the set slot; and a reconfigurable intelligent surface (RIS) that controls passive elements in groups, modulates the groups into different signals at the same time, and transmits the signals to a plurality of WuR terminals in a beamforming manner.

20 Claims, 6 Drawing Sheets

(58) Field of Classification Search
CPC ......... H04W 52/0235; H04W 52/0225; H04W
74/0808; H04W 74/0816; H04W 74/04;
H04W 84/12; Y02D 30/70; H04B
7/04013; H04B 7/04026; H04B 7/15528
See application file for complete search history.

(56) References Cited

U.S. PATENT DOCUMENTS

| | | | | |
|---|---|---|---|---|
| 2019/0349926 A1* | 11/2019 | Alanen | ................. | H04W 92/20 |
| 2022/0124806 A1* | 4/2022 | Hu | ......................... | H04W 16/28 |
| 2024/0063863 A1* | 2/2024 | Wang | ................... | H04W 76/28 |
| 2024/0163797 A1* | 5/2024 | Yu | ....................... | H04W 52/028 |
| 2024/0380438 A1* | 11/2024 | Elshafie | ............ | H04W 52/0235 |
| 2024/0413886 A1* | 12/2024 | Yoshioka | .............. | H04W 16/28 |

OTHER PUBLICATIONS

Choi, Eun-Jin, "Low Power Channel Contention Protocol for High Efficiency Data Transmission in Backscatter Wake-Up Radio" Master's Thesis, Department of Electrical and Computer Engineering, The Graduate School Sungkyunkwan University., 2021, (64 pages).
Basar, Ertugrul, et al., "Present and Future of Reconfigurable Intelligent Surface-Empowered Communications" IEEE Signal Processing Magazine 38.6, arXiv:2105.00671v2 [eess.SP] Aug. 17, 2021: (11 pages).
Korean Office Action issued on Jun. 10, 2024, in counterpart Korean Patent Application No. 10-2021-0155053 (6 pages in English, 5 pages in Korean).

\* cited by examiner

DATA COLLECTION SYSTEM AND METHOD USING RECONFIGURABLE INTELLIGENT SURFACE FOR WAKE-UP CONTROL, AND COMPUTER-READABLE RECORDING MEDIUM STORING INSTRUCTIONS THEREFOR

This work was supported by National Research Foundation of Korea (NRF) grant funded by Korea government (MSIT) (No. 2021R1A2B5B01002661, Development of Convergence Networks for Highly Scalable Beamforming-Backscatter Wireless Communications based on Multi-reconfigurable intelligent surface (RIS).

CROSS-REFERENCE TO RELATED APPLICATION

This application claims priority to Korean Patent Application No. 10-2021-0155053, filed on Nov. 11, 2021. The entire contents of the application on which the priority is based are incorporated herein by reference.

TECHNICAL FIELD

The present disclosure relates to a system and a method for collecting data in a wireless local area network (WLAN) environment.

BACKGROUND

Since terminals constituting a wireless network generally have energy storage devices with limited capacity and thus have limitations in operating time, wake-up radio technology is being studied to prevent unnecessary power consumption of terminals. Upon receiving the wake-up signal from the AP, the WuR terminal operates in active mode and transmits data to the AP. When the wake-up signal is not received, the WuR terminal operates in sleep mode to save energy without performing unnecessary operations.

The AP generally collects information of all terminals, but in a specific situation, it is required to quickly collect necessary data. In an existing wake-up based network, since all terminals in the network receive the wake-up signal transmitted by the AP, the AP cannot collect data by transmitting the wake-up signal only to specific terminals, and all terminals that receive the wake-up signal operate in active mode. Therefore, since all terminals in the network perform channel contention and transmit data, terminals perform unnecessary operations, and unnecessary energy waste may occur due to collisions between data transmissions, and data collection delay time may increase.

Recently, RIS has been studied as a technology for controlling a radio channel environment in the field of wireless communication. The RIS may transmit the signal to the AP by reflecting the signal transmitted by the terminal in a specific direction through beamforming, and the RIS that received the unmodulated signal may transmit the information that the AP is about to transmit to the terminal by performing its own modulation process.

In addition, RIS has the advantage of being able to selectively transmit the signal to a specific terminal located in a short distance by adjusting the phase of each passive element. However, in a network composed of a plurality of terminals, if the time consumed in the process of controlling the RIS for the terminals or the AP to transmit signals using the RIS is increased, there is a problem in that data throughput performance and latency performance are lowered.

SUMMARY

An object to be solved by the present disclosure is to provide a data collection system and a data collection method capable of efficiently controlling the RIS.

In accordance with an aspect of the present disclosure, there is provided a data collection system, the data collection system comprise: a wake-up radio (WuR) terminal that operates in sleep mode when a wake-up signal is not received and transmits data in active mode when the wake-up signal is received; an Access Point (AP) terminal that stores information on a total number of WuR terminals in a network and sensing data collected by the WuR terminal, sets a slot through which the data is to be transmitted by the WuR terminal, and receives the data from the WuR terminal in the set slot; and a reconfigurable intelligent surface (RIS) that controls passive elements in groups, modulates the groups into different signals at the same time, and transmits the signals to a plurality of WuR terminals in a beamforming manner.

The AP terminal may adjust the number of signals to be simultaneously transmitted through the RIS according to the number of WuR terminals to be selectively collected.

The RIS may change the number of groups according to one or more of a size of the RIS, the number of passive elements in the RIS, and a current channel.

The AP terminal may determine the number of signals to be simultaneously transmitted through the RIS through [Equation 1], [Equation 2] and [Equation 3] based on the channel state and the number of WuR terminals for collecting data.

$$K = L \qquad \text{[Equation 1]}$$

$$K = \min(M, L) \qquad \text{[Equation 2]}$$

$$K = \begin{cases} L, & \alpha > \alpha_{th} \\ \dfrac{L}{2}, & \alpha \le \alpha_{th} \end{cases} \qquad \text{[Equation 3]}$$

Herein, $\alpha$ is the path loss coefficient of the current channel, $\alpha_{th}$ is the threshold value of the channel path loss coefficient preset in the network, K is the number of signals to be simultaneously transmitted through the RIS, and L is the maximum number of signals that can be simultaneously transmitted.

The AP terminal may transmit a wake-up signal and control information to the WuR terminal through the RIS.

The WuR terminal may determine the control information including information on the slot through which the data is to be transmitted, and transmit the data to the AP terminal in the slot through which the data is to be transmitted.

The WuR terminal may receive an ACK message from the AP terminal and switch to the sleep mode.

The WuR terminal may receive the wake-up signal, and when control information is not received, the WuR terminal may check an idle state of a channel in the network and transmit the data to the AP terminal according to the idle state of the channel.

The WuR terminal may check a backoff counter value and transmit a request to send (RTS) frame to the AP terminal based on the checked backoff counter value.

The WuR terminal may receive a clear to send (CTS) frame from the AP terminal and transmit the data to the AP terminal.

The WuR terminal may decrease the backoff counter value by a predetermined unit size when the channel is in an idle state, and transmit the RTS frame when the checked backoff counter value is 0.

When the WuR terminal does not receive the CTS frame, the value of the backoff stage is increased by a predetermined unit size.

In accordance with another aspect of the present disclosure, there is provided a method for collecting data by controlling a wake-up radio (WuR) terminal in a network system including the WuR terminal, the method comprise: receiving a wake-up signal transmitted from the AP terminal through the RIS; switching to active mode upon receiving the wake-up signal; when control information is further received together with the wake-up signal, identifying information of a time slot to transmit data to the AP terminal by checking the received control information; and transmitting data to the AP terminal based on the identified information of the time slot.

The method further comprises after transmitting data to the AP terminal, receiving an ACK message from the AP terminal and switching to the sleep mode.

The method further comprises after receiving the wake-up signal, if the control information is not received, checking whether a channel in the network is in idle state; and transmitting the data to the AP terminal according to whether the channel is idle state.

The transmitting of the data to the AP terminal according to whether the channel is idle state further comprises: checking the backoff counter value; and transmitting a request to send (RTS) frame to the AP terminal based on the checked backoff counter value.

The transmitting of the data to the AP terminal according to whether the channel is idle state further comprises: transmitting the data to the AP terminal upon receiving a clear to send (CTS) frame from the AP terminal.

The transmitting of the data to the AP terminal according to whether the channel is idle state further comprises: decreasing the backoff counter value by a predetermined unit size when the channel is in idle state; and transmitting the RTS frame when the checked backoff counter value is 0.

The transmitting of the data to the AP terminal according to whether the channel is idle state further comprises: increasing a value of a backoff stage by a predetermined unit size when the CTS frame is not received.

In accordance with another aspect of the present disclosure, there is provided a non-transitory computer-readable recording medium storing a computer program, which comprises instructions for a processor to perform a method for collecting data by controlling a wake-up radio (WuR) terminal, the method comprise: receiving a wake-up signal transmitted from an access point (AP) terminal included in a network system including a wake-up radio (WuR) terminal, the AP terminal, and a reconfigurable intelligent surface (RIS), through the RIS; switching to active mode upon receiving the wake-up signal; when control information is further received together with the wake-up signal, identifying information of a time slot to transmit data to the AP terminal by checking the received control information; and transmitting data to the AP terminal based on the identified information of the time slot.

According to the present disclosure, the AP selectively activates a specific WuR terminal in an active mode as required and allocates resources to transmit data, so that the terminals can perform data transmission without channel competition, resulting in energy efficiency performance and data transmission latency performance of the terminal can be improved.

In addition, since the AP does not transmit a wake-up signal to all terminals, there is an effect of minimizing channel contention load of the terminals and collecting only specific data to be collected rapidly.

DETAILED DESCRIPTION

Figure 1:
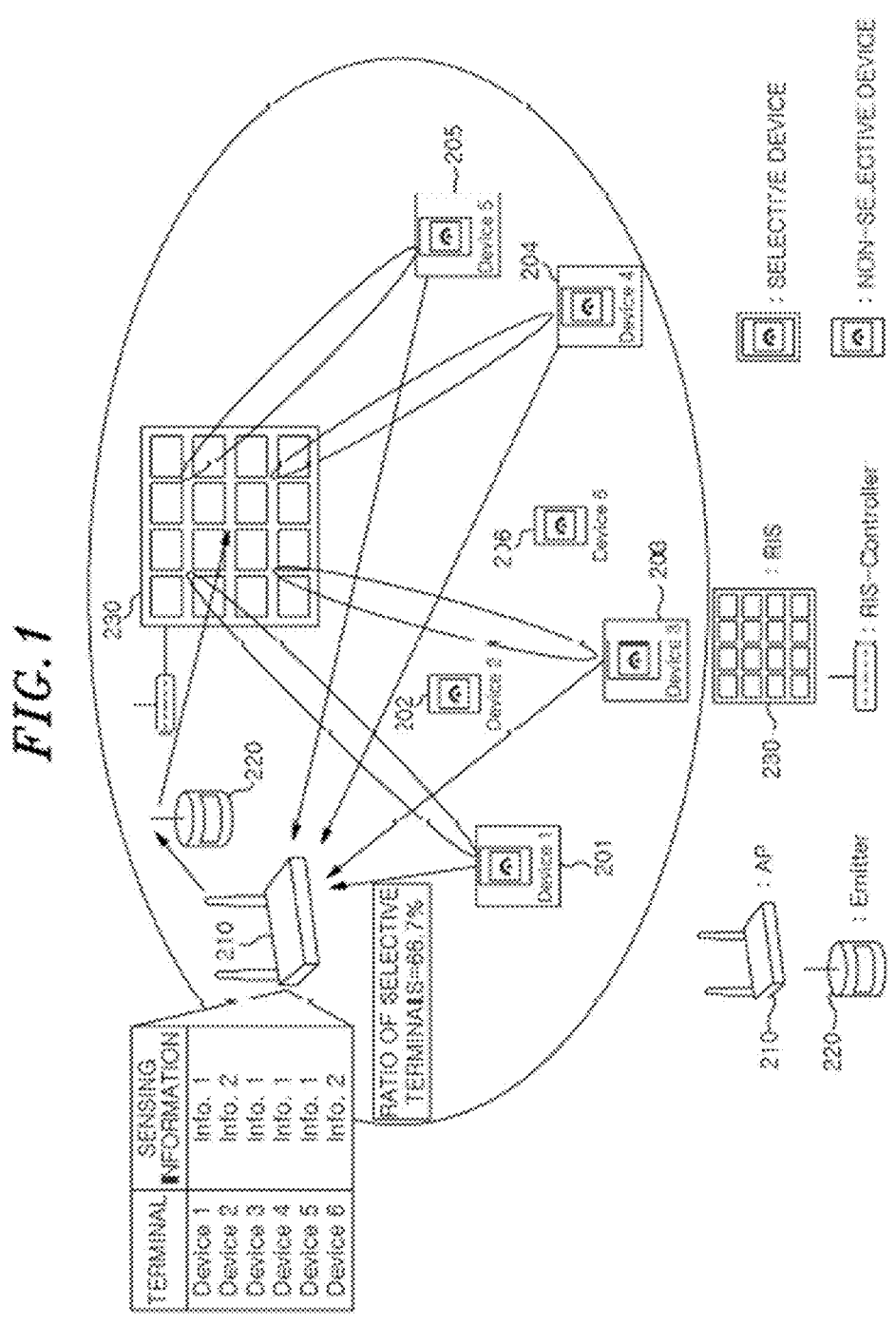
FIG. 1 is a diagram illustrating a data collection system according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a diagram illustrating a data collection system according to an embodiment of the present disclosure.

Referring to FIG. 1, the data collection system of the present disclosure may include one access point (AP) terminal, a reconfigurable intelligent surface (RIS), an emitter, and a plurality of wake-up radio (WuR) terminals. Each WuR terminal may operate in sleep mode when it does not receive a wake-up signal, and may operate in active mode and transmit data to the AP when it receives a wake-up signal. Further, the WuR terminal that has successfully transmitted data may change back to the sleep mode and save energy.

Figure 2:
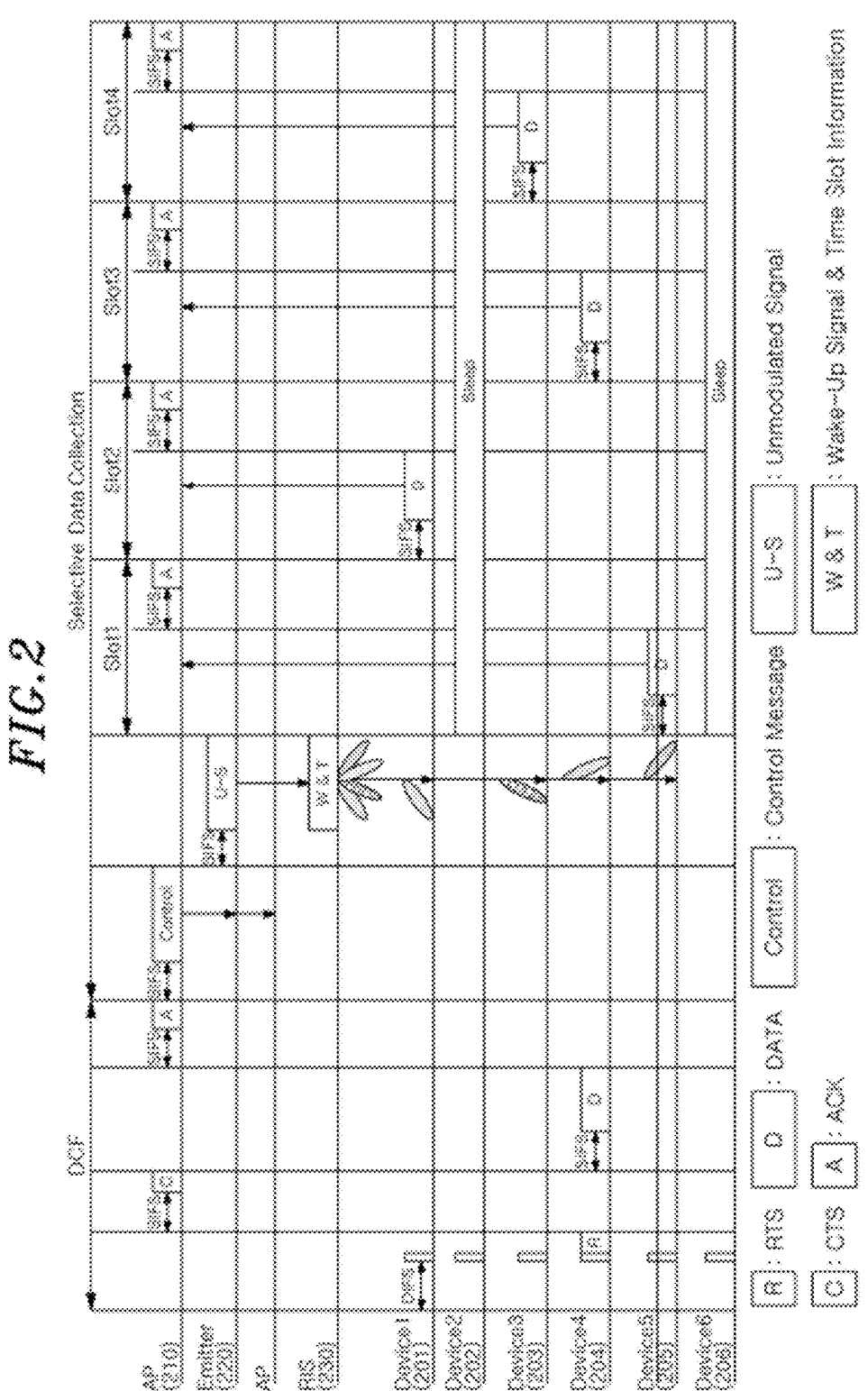
FIG. 2 is a diagram illustrating an operation example of a protocol of a data collection system according to the embodiment of the present disclosure.

FIG. 2 is a diagram illustrating an operation example of a protocol of a data collection system according to the embodiment of the present disclosure.

Referring to FIG. 2, the data collection system according to the embodiment of the present disclosure configures a network with six WuR terminals 201, 202, 203, 204, 205, 206, and the RIS 230 configures each passive element controlled by L groups, up to L different signals can be simultaneously modulated and transmitted to the WuR terminals 201, 202, 203, 204, 205, 206 in a beamforming manner. Here, the L value may be flexibly changed according to the size of the RIS, the number of passive elements in the RIS, and the current channel state.

In this embodiment, simultaneous modulation of up to four signals is used as an example, but the maximum number L of signals that can be simultaneously transmitted may be changed according to network settings. The AP terminal 210 knows both the total number N of WuR terminals in the network and information on the sensing data collected by the WuR terminals through the previous communication process, and the AP terminal 210 may adjust the number K of signals to be simultaneously transmitted through the RIS 230 according to the number M of WuR terminals to be selectively collected.

In addition, the AP terminal 210 may collect data flexibly by reducing the number of WuR terminals simultaneously controlled by the RIS 230 when the channel state within the network is not good. First, the fourth WuR terminal 204 exchanges RTS (Request-To-Send)/CTS (Clear-To-Send) with the AP terminal 210 through DCF (Distributed Coordination Function) method channel competition and transmits data.

The AP terminal 210 finally transmits an ACK to the fourth WuR terminal 204 that transmits data and determines the next transmission method during the SIFS time. The AP terminal 210 for collecting specific data first determines the number K of signals to be simultaneously transmitted through the RIS 230 in consideration of the number M of WuR terminals to selectively collect data and the current channel state. As an example, the AP terminal 210 may determine the K value through the following equations based on the channel state and the number M of WuR terminals for collecting data.

$$K = L \qquad \text{[Equation 1]}$$

$$K = \min(M, L) \qquad \text{[Equation 2]}$$

$$K = \begin{cases} L, & \alpha > \alpha_{th} \\ \dfrac{L}{2}, & \alpha \leq \alpha_{th} \end{cases} \qquad \text{[Equation 3]}$$

Here, $\alpha$ is the path loss coefficient of the current channel, and $\alpha_{th}$ is the threshold value of the channel path loss coefficient preset in the network.

Then, based on the channel information obtained from the previous communication with the WuR terminal for collecting data, a control message is transmitted to the controller of the emitter 220 and the RIS 230, and the emitter 220 that received the message transmits the unmodulated signal to the RIS 230.

At this time, the WuR terminals in the sleep state may not receive the emitter's unmodulated signal. The RIS 230 transmits the wake-up signal and data transmission slot information of each WuR terminal in the form of K (e.g., K=4) multiple beams to the first, third, fourth, and fifth WuR terminals 201, 203, 204, 205 through its own modulation process under the control of the unmodulated signal and the AP terminal 210.

The second and sixth WuR terminals 202, 206 that did not receive the wake-up signal and control information from the RIS 230 continue to operate in the sleep mode. Upon receiving the wake-up signal and control message from the RIS 230, the WuR terminals 201, 203, 204, 205 switch to the active mode and transmit data to the AP terminal 210 in their data transmission slots.

When the channel state in the network is not good, WuR terminals can compensate for the channel state through RIS by transmitting data to the AP terminal using the RIS. From the fifth WuR terminal 205, data is transmitted to the transmission slot section designated by the AP terminal 210, and then an ACK message is received from the AP terminal 210. Thereafter, the first, fourth, and third WuR terminals 201, 204, 203 sequentially transmit data to the AP terminal 210, and the transmitted WuR terminals 201, 204, 203 are switched to the sleep mode.

At this time, the WuR terminals 201, 204, 203 transmit data in a designated transmission slot under the control of the AP terminal 210, thereby minimizing unnecessary channel competition and energy waste. The AP terminal 210 can quickly collect necessary data by repeating the process until it collects all the data of the WuR terminal it wants to receive.

Figure 3A:
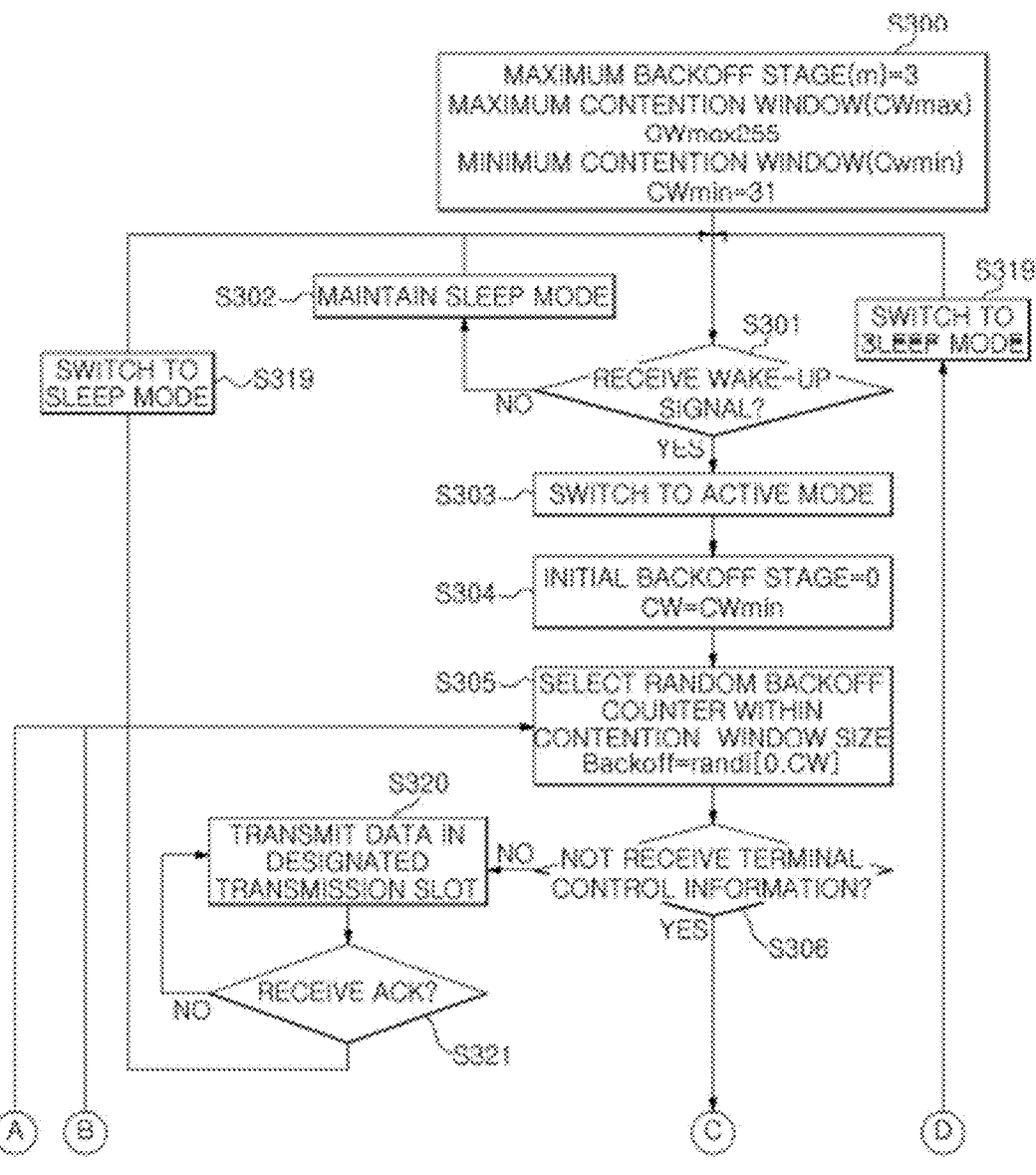
FIGS. 3A and 3B are flowcharts illustrating an operation process of a terminal using a low-power channel contention and an efficient data transmission protocol method of a data collection method according to the embodiment of the present disclosure.
Figure 3B:
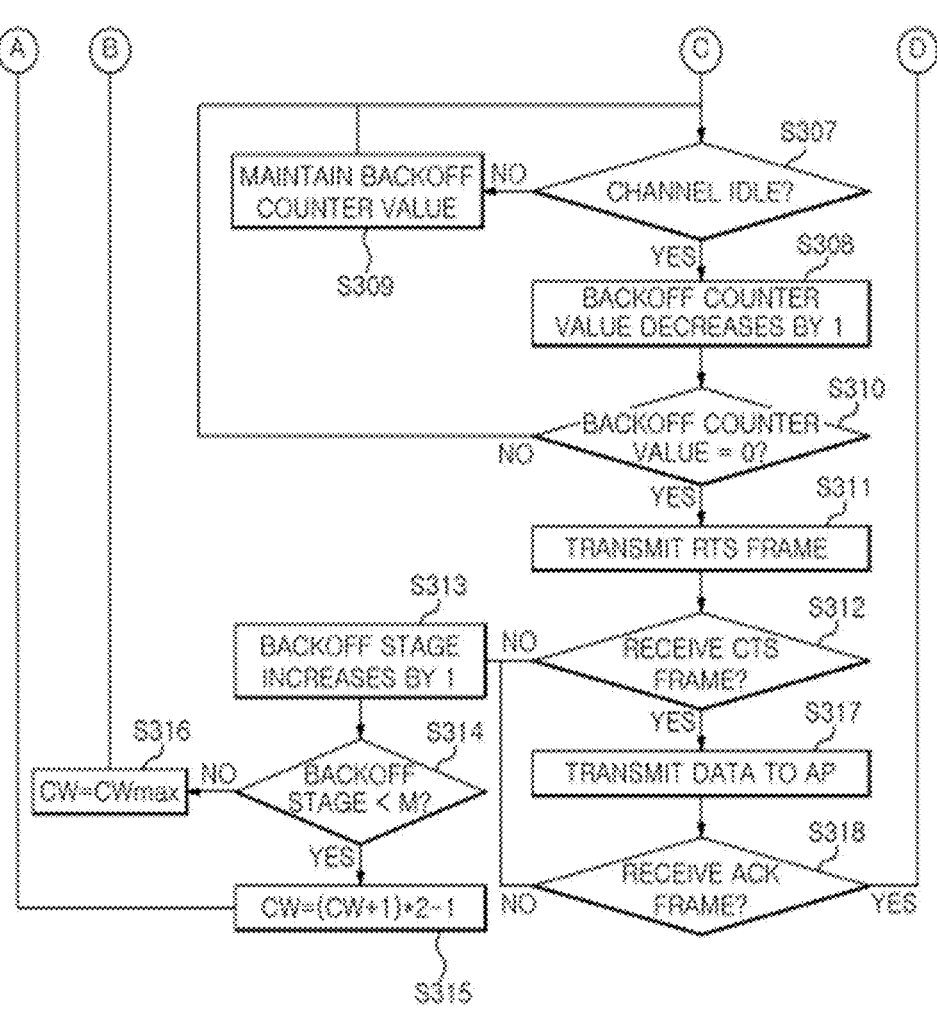

FIGS. 3A and 3B are flowcharts illustrating an operation process of the WuR terminal included in the data collection system according to the embodiment of the present disclosure.

Referring to FIGS. 3A and 3B, first, WuR terminals may set a backoff stage value, a minimum contention window size, a maximum contention window size (S300), and so on.

Thereafter, the WuR terminals maintain the sleep mode (S302) when they did not receive a wake-up signal from the AP terminal (S301—No), and switch to the active mode (S303) when they received the wake-up signal (S301—Yes). Here, the WuR terminals may set the initial backoff stage value to 0 (S304), set the contention window value to the minimum contention window size, and select an arbitrary backoff counter value within the contention window size (S305).

Thereafter, depending on whether the WuR terminal has received control information, it is divided into a process of transmitting only data of a specific WuR terminal and a process of transmitting data through DCF contention of all WuR terminals (S306).

If the channel continues to be detected and the channel is idle (S307—Yes), the backoff counter value is decreased by 1 (S308), and if the channel is not idle (S307—No), the backoff counter value is maintained (S309). This process is repeated, and if the value of the backoff counter becomes 0 (S310—Yes), the WuR terminal transmits the RTS frame to the AP terminal (S311). At this time, if a plurality of WuR terminals transmit RTS frames at the same time and a collision occurs, the WuR terminal cannot receive the CTS frame from the AP terminal. In this case (S312—No), the WuR terminal increases the backoff stage by 1 (S313), compares the backoff stage value with the maximum backoff stage value (m), and if the backoff stage value is smaller than the maximum backoff stage value (m) (S314—Yes), the contention window value is increased (S315), and the back-off counter is selected again in step S305.

If the current backoff stage value is equal to or greater than the maximum backoff stage (S314—No), the value of the contention window is set to the maximum contention window value (CW_max) (S316), and the backoff counter is selected in step S305.

When the WuR terminal successfully received the CTS frame (S312—Yes), the WuR terminal transmits data to the AP terminal (S317) and waits for an ACK message. Then, when the WuR terminal receives the ACK message (S318—Yes), it switches to the sleep mode and waits until the next wake-up signal is received (S319). On the other hand, if the WuR terminal does not receive the ACK message (S318—Yes), it may proceed to step S313.

When the WuR terminal receives control information from the RIS (S306—No), the WuR terminal can check transmission slot information designated by the AP terminal through the control information, and each WuR terminal may transmit data when the order of the own transmission slot is reached without contention according to the transmission slot information designated by the AP terminal (S320). Thereafter, the WuR terminal receives the ACK message from the AP terminal (S321—Yes), and may perform an operation of switching to the sleep mode (S319). Through this, data of a specific WuR terminal can be quickly collected while minimizing unnecessary competition and energy waste of WuR terminals.

Figure 4:
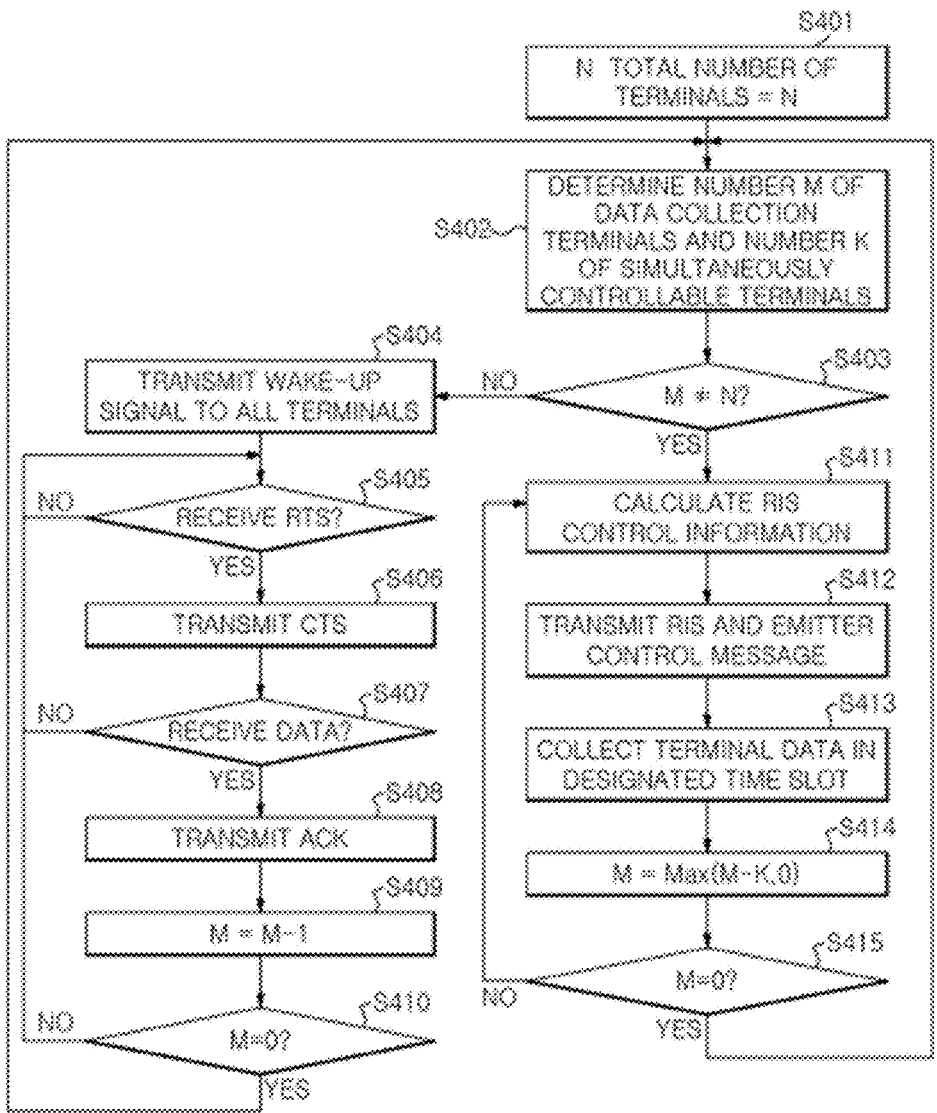
FIG. 4 is a flowchart illustrating an operation process of an AP in the data collection method according to the embodiment of the present disclosure.

FIG. 4 is a flowchart illustrating an operation process of an AP included in the data collection system according to the embodiment of the present disclosure.

Referring to FIG. 4, first, the AP terminal may set the number of all terminals (i.e., WuR terminals) as an initial value N (S401).

Thereafter, when the data transmission interval starts, the AP terminal determines the number M of WuR terminals for collecting data and the number K of signals to be simultaneously transmitted through RIS (S402). In a general case where the total number N of WuR terminals and the number M of WuR terminals to be collected are the same (S403—No), the AP terminal transmits a wake-up signal to all WuR terminals (S404) and switch all terminals into sleep mode, and the WuR terminals transmit data to the AP terminal through DCF contention (S405, S406).

When the AP terminal receives data from the WuR terminal (S407—Yes), the AP terminal receiving the data of the WuR terminal decreases the M value by 1 (S408, S409), and if the data of all WuR terminals is collected (M=0) (S410—yes), the next data collection section is started. If the AP terminal wants to receive data from a specific WuR terminal, that is, if the N and M values are different (S403—Yes), the AP terminal calculates RIS control information for transmitting a wake-up signal to terminals based on the channel state information acquired through data exchange in the previous data collection section (S411).

Thereafter, the AP terminal transmits a message including data transmission slot information of the WuR terminal and control information of the RIS and the emitter to the RIS controller and the emitter (S412). Thereafter, the AP terminal collects the data of the WuR terminal in the designated time slot (S413), and decreases the M value by the number K of collected data (S414). If the M value is not 0 (S415—No), since the AP terminal did not collect all the data of the selected WuR terminal, it returns to the step of calculating the control information of the RIS and the emitter and collects the data of the specific WuR terminal by repeating the process again.

A simulation was performed to evaluate the performance of the selective WuR terminal control protocol of the AP terminal using the RIS self-modulation method in the proposed wake-up radio network. In order to evaluate the performance of the proposed method, the time taken to receive all the data of specific WuR terminals was measured in comparative examples based on the existing DCF method and examples based on the proposed protocol method. The parameters used in the simulation were set as shown in Table 1.

TABLE 1

| Parameter | Value |
|---|---|
| Minimum Competition Window, CWmin | 31 |
| Maximum backoff stage, m | 3 |
| number N of WuR terminals | 25-300 |
| Percentage of selective WuR terminals | 20, 50, 80(%) |
| Payload | 8184 bits |

In comparative examples using the existing DCF method, the AP terminal transmits a wake-up signal to all WuR terminals, and the WuR terminal that received the corresponding signal transmits data through DCF contention.

In the embodiments according to the proposed protocol method, the AP terminal sets the transmission slot of the WuR terminal, and each WuR terminal is configured to transmit data when the order of its transmission slot is reached without channel contention.

While increasing the number of WuR terminals from 25 to 300, the ratio of WuR terminals to be selectively received was adjusted. Simulation was performed such that Example 1 and Comparative Example 1 were configured by setting the ratio of WuR terminals to receive to 20% (M=0.2 N) of the total number of WuR terminals, Example 2 and Comparative Example 2 were configured by setting the ratio of WuR terminals to receive to 50% (M=0.5 N), and Example 3 and Comparative Example 3 were configured by setting the ratio of WuR terminals to receive to 80% (M=0.8 N).

Figure 5:
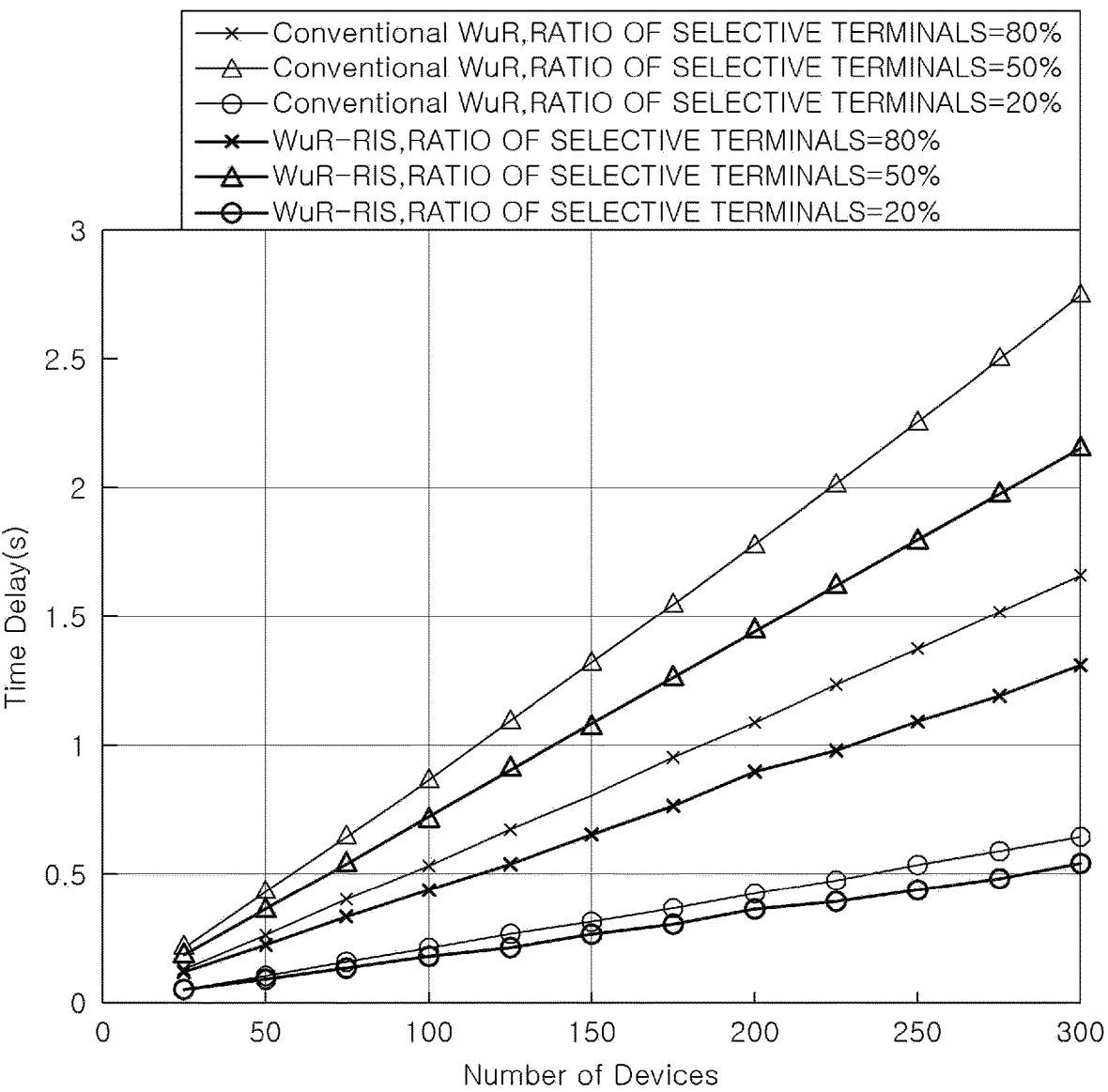
FIG. 5 is a graph showing data collection delay time according to the total number of terminals in comparative examples and examples.

FIG. 5 is a graph showing data collection delay time according to the total number of terminals in Comparative Examples and Examples.

Referring to FIG. 5, when the ratio of the WuR terminals selected by the AP terminal is 20% of the total number of WuR terminals, that is, in the case of Comparative Example 1 and Example 1, since the number of WuR terminals is small and data collisions are small, the delay time performance difference between Comparative Example 1 and Example 1 was measured to be small.

In Comparative Example 2 and Example 2, the ratio of specific WuR terminals selected by the AP terminal was set higher than in Comparative Example 1 and Example 1. Looking at the simulation results of Comparative Example 2 and Example 2, even if the total number of WuR terminals is the same, there is an effect that the delay time of Example 2 is shorter than that of Comparative Example 2. In addition, it can be seen that the delay time difference between Comparative Example 2 and Example 2 is larger than that between Comparative Example 1 and Example 1.

Similarly, in Comparative Example 3 and Example 3, the ratio of specific WuR terminals selected by the AP terminal was set higher than in Comparative Example 2 and Example 2. Looking at the simulation results of Comparative Example 3 and Example 3, it can be seen that the delay time of Example 2 is shorter than that of Comparative Example 2, and the difference in delay time between Comparative Example 3 and Example 3 is greater than the difference in delay time between Comparative Example 2 and Example 2.

As such, it can be seen that the delay time performance of the method proposed in the present disclosure is improved, and as the ratio of specific WuR terminals selected by the AP terminal increases, the delay time performance is improved more than the existing method. In the case of the existing method, since a specific WuR terminal that received a wake-up signal competes with all WuR terminals to transmit data, as the total number of WuR terminals increases, the time required to receive data from the specific WuR terminal was increased than the method proposed in the present disclosure.

However, in the method proposed in the present disclosure, it was confirmed that the AP terminal collects data of a specific WuR terminal by simultaneously allocating resources to a plurality of specific WuR terminals through RIS, and the WuR terminals transmit data without contention, thereby significantly reducing data collection delay time. As the total number of WuR terminals increases, the delay time performance of the proposed method is greatly improved compared to the existing method. Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A data collection system comprising:
   a wake-up radio (WuR) terminal that operates in sleep mode when a wake-up signal is not received and transmits data in active mode when the wake-up signal is received;
   an Access Point (AP) terminal that stores information on a total number of WuR terminals in a network and sensing data collected by the WuR terminal, sets a slot through which the data is to be transmitted by the WuR terminal, and receives the data from the WuR terminal in the set slot; and
   a reconfigurable intelligent surface (RIS) that controls passive elements in groups, modulates the groups into different signals at the same time, and transmits the signals to a plurality of WuR terminals in a beamforming manner,
   wherein the RIS, responsive to control from the AP, self-modulates an unmodulated signal into K mutually distinct wake-up signals that each embed time-slot information for a respective WuR terminal and simultaneously beamforms the K wake-up signals toward the respective WuR terminals such that only addressed WuR terminals switch to active mode while non-addressed WuR terminals remain in sleep mode.

2. The system of claim 1, wherein the AP terminal adjusts a number of wake-up signals to be simultaneously transmitted through the RIS based on a number of WuR terminals designated for data collection within a given cycle.

3. The system of claim 1, wherein the RIS changes the number of groups according to one or more of a size of the RIS, the number of passive elements in the RIS, and a current channel.

4. The system of claim 1,
   wherein the AP terminal determines a number (K) of wake-up signals to be simultaneously transmitted through the RIS using [Equation 1], [Equation 2], or [Equation 3] based on channel conditions and a number (M) of WuR terminals to be activated,

11

$$K = L \qquad \text{[Equation 1]}$$

$$K = \min(M, L) \qquad \text{[Equation 2]}$$

$$K = \begin{cases} L, & \alpha > \alpha_{th} \\ \dfrac{L}{2}, & \alpha \le \alpha_{th} \end{cases} \qquad \text{[Equation 3]}$$

wherein, $\alpha$ is a path loss coefficient of a current channel, $\alpha_{th}$ is a preset threshold for acceptable channel conditions, K is the number of wake-up signals, M is the number of WuR terminals, and L is a maximum number of signals that can be simultaneously transmitted.

5. The system of claim 1, wherein the AP terminal transmits a wake-up signal and control information to the WuR terminal through the RIS.

6. The system of claim 5, wherein the WuR terminal determines the control information including information on the slot through which the data is to be transmitted, and transmits the data to the AP terminal in the slot through which the data is to be transmitted.

7. The system of claim 6, wherein the WuR terminal receives an ACK message from the AP terminal and switches to the sleep mode.

8. The system of claim 1, wherein the WuR terminal receives the wake-up signal, and when control information is not received, the WuR terminal checks an idle state of a channel in the network and transmits the data to the AP terminal according to the idle state of the channel.

9. The system of claim 8, wherein the WuR terminal checks a backoff counter value and transmits a request to send (RTS) frame to the AP terminal based on the checked backoff counter value.

10. The system of claim 9, wherein the WuR terminal receives a clear to send (CTS) frame from the AP terminal and transmits the data to the AP terminal.

11. The system of claim 9, wherein the WuR terminal decreases the backoff counter value by a predetermined unit size when the channel is in an idle state, and transmits the RTS frame when the checked backoff counter value is 0.

12. The system of claim 10, wherein when the WuR terminal does not receive the CTS frame, the value of the backoff stage is increased by a predetermined unit size.

13. A method for collecting data by controlling a wake-up radio (WuR) terminal in a network system including the WuR terminal, an access point (AP) terminal, and a reconfigurable intelligent surface (RIS), the method comprising:
   receiving a wake-up signal transmitted from the AP terminal through the RIS;
   switching to active mode upon receiving the wake-up signal;
   when control information is further received together with the wake-up signal, identifying information of a time slot to transmit data to the AP terminal by checking the received control information; and
   transmitting data to the AP terminal based on the identified information of the time slot,
   wherein the receiving comprises receiving, through the RIS that self-modulates an unmodulated signal, a plurality of mutually distinct wake-up signals simultaneously beamformed toward respective WuR terminals, each wake-up signal embedding time-slot information for its respective WUR terminal such that only addressed WuR terminals switch to active mode while non-addressed WuR terminals remain in sleep mode.

14. The method of claim 13, further comprising:
   after transmitting data to the AP terminal, receiving an ACK message from the AP terminal and switching to the sleep mode.

15. The method of claim 13, further comprising:
   after receiving the wake-up signal, if the control information is not received, checking whether a channel in the network is in idle state; and
   transmitting the data to the AP terminal according to whether the channel is idle state.

16. The method of claim 15, wherein the transmitting of the data to the AP terminal according to whether the channel is idle state further comprises:
   checking the backoff counter value; and
   transmitting a request to send (RTS) frame to the AP terminal based on the checked backoff counter value.

17. The method of claim 16, wherein the transmitting of the data to the AP terminal according to whether the channel is idle state further comprises:
   transmitting the data to the AP terminal upon receiving a clear to send (CTS) frame from the AP terminal.

18. The method of claim 15, wherein the transmitting of the data to the AP terminal according to whether the channel is idle state further comprises:
   decreasing the backoff counter value by a predetermined unit size when the channel is in idle state; and
   transmitting the RTS frame when the checked backoff counter value is 0.

19. The method of claim 17, wherein the transmitting of the data to the AP terminal according to whether the channel is idle state further comprises:
   increasing a value of a backoff stage by a predetermined unit size when the CTS frame is not received.

20. A computer-readable recording medium storing a computer program comprising commands for a processor to perform a method, the method comprising:
   receiving a wake-up signal transmitted from an access point (AP) terminal included in a network system including a wake-up radio (WuR) terminal, the AP terminal, and a reconfigurable intelligent surface (RIS), through the RIS;
   switching to active mode upon receiving the wake-up signal;
   when control information is further received together with the wake-up signal, identifying information of a time slot to transmit data to the AP terminal by checking the received control information; and
   transmitting data to the AP terminal based on the identified information of the time slot,
   wherein receiving the wake-up signal comprises receiving, through the RIS that self-modulates an unmodulated signal, a wake-up signal that embeds time-slot information for a respective WuR terminal and is transmitted simultaneously with other wake-up signals toward other WuR terminals via beamforming such that only addressed WuR terminals switch to active mode while non-addressed WuR terminals remain in sleep mode.

* * * * *